United States Patent [19]
Madaffer

[11] Patent Number: 4,597,365
[45] Date of Patent: Jul. 1, 1986

[54] CAMSHAFT ASSEMBLY AND METHOD

[75] Inventor: Anthony J. Madaffer, Brighton, Mich.

[73] Assignee: General Motors Corporation, Detroit, Mich.

[21] Appl. No.: 699,313

[22] Filed: Feb. 7, 1985

[51] Int. Cl.$^4$ .............. F01L 1/46; F16H 53/00; B23P 15/00; B21D 39/00
[52] U.S. Cl. .............. 123/90.6; 29/156.4 R; 29/283.5; 29/445; 29/467; 29/522 R; 29/523; 29/DIG. 19; 72/370; 72/377; 74/567
[58] Field of Search .............. 29/523, 156.4 R, 283.5, 29/445, 467, 522 R, DIG. 19; 72/370, 377; 74/567, 569, 53, 54, 55; 123/90.31, 90.6

[56] References Cited

U.S. PATENT DOCUMENTS

| | | | |
|---|---|---|---|
| 1,390,949 | 9/1921 | Yassenoff | 74/567 |
| 2,202,330 | 5/1940 | Brock et al. | 29/156.4 R |
| 3,845,667 | 11/1974 | Honrath et al. | 74/567 |
| 3,869,938 | 3/1975 | Schlotterbeck et al. | 74/567 |
| 4,265,388 | 5/1981 | Takahashi et al. | 29/525 X |
| 4,293,995 | 10/1981 | Jordan | 29/523 X |
| 4,382,390 | 5/1983 | Jordan | 74/567 |

FOREIGN PATENT DOCUMENTS

| | | | |
|---|---|---|---|
| 408875 | 10/1923 | Fed. Rep. of Germany | 29/523 |
| 2336241 | 2/1975 | Fed. Rep. of Germany | 123/90.6 |
| 552028 | 4/1923 | France | 123/90.6 |
| 7644 | 2/1971 | Japan | 29/523 |
| 149655 | 9/1982 | Japan | 74/567 |
| 275842 | 8/1927 | United Kingdom | 74/567 |
| 489326 | 7/1935 | United Kingdom | 74/567 |
| 729989 | 5/1955 | United Kingdom | 29/523 |

OTHER PUBLICATIONS

"Typical Applications of Ball-O-Matic ® Ballizing"; Farmington Hills, Michigan, (undated information sheet).
Thumuki, C., et al.; "Development of Sintered Integral Camshaft", Society for Automotive Engineers paper No. 830254; Detroit, Michigan (Feb. 28-Mar. 4, 1983).

Primary Examiner—Howard N. Goldberg
Assistant Examiner—Ronald S. Wallace
Attorney, Agent, or Firm—Robert J. Outland

[57] ABSTRACT

A camshaft for an internal combustion engine or the like is formed of an expandable steel tube and individual preferably hardenable cam and journal elements fixed together by a mechanical expansion of the tube by a mandrel or other device. Material selection and processes for low cost manufacture are disclosed.

12 Claims, 7 Drawing Figures

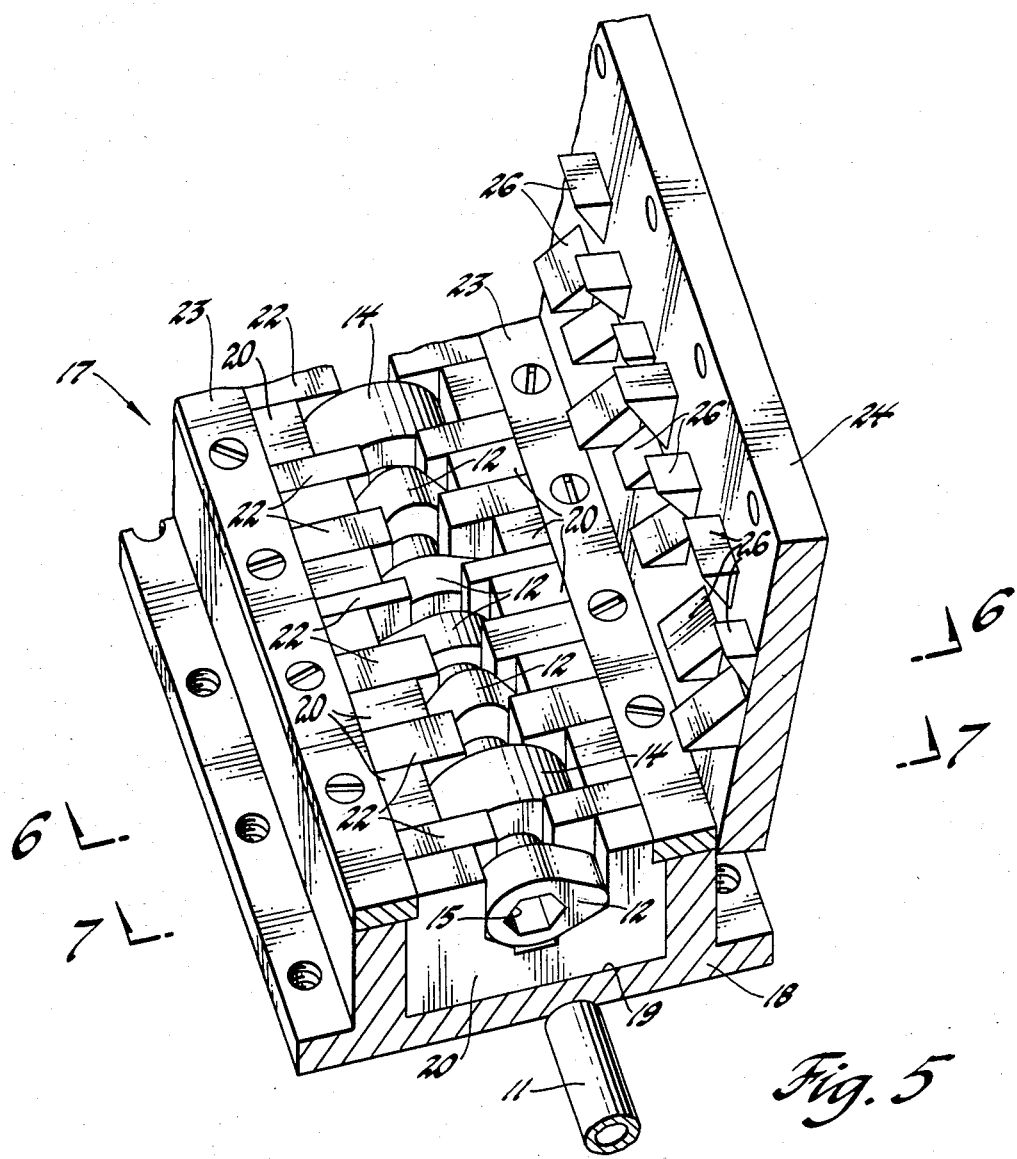
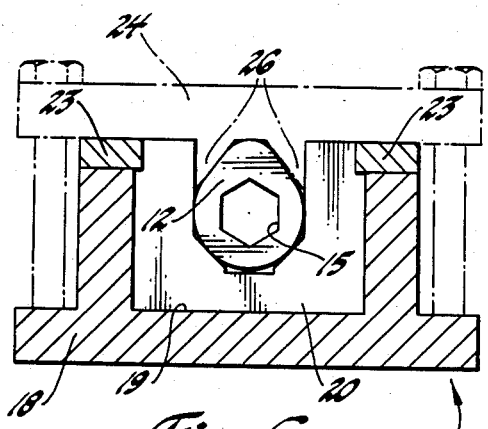
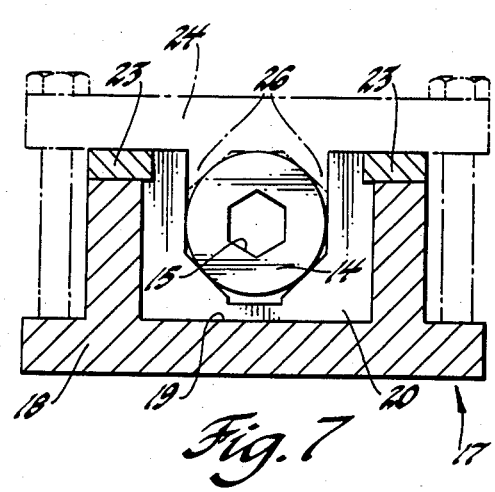

CAMSHAFT ASSEMBLY AND METHOD

TECHNICAL FIELD

This invention relates to camshafts such as may be used for actuating the valve gear of internal combustion engines and the like. More particularly, the invention relates to camshafts assembled from multiple elements and methods of their manufacture.

BACKGROUND

Various types of camshafts for engines and the like have been manufactured or proposed to be manufactured by assembling individual components, such as cams and journals, on a separate shaft with provision for fixing the assembled elements together in predetermined relation. However, various shortcomings exist in the prior art assembled camshafts and their methods of manufacture which can result in less than desired utility or excessive cost.

SUMMARY OF THE INVENTION

The present invention provides camshaft assemblies of multiple elements and methods for manufacturing such assemblies which provide advantages in the quality of camshaft construction and/or simplicity of manufacture ove previous known assemblies and systems.

A camshaft, according to the invention, includes a plurality of cam and journal elements which are, preferably, formed from high-hardenability steel, for example A1SI 5150 or equivalent. The journal elements could be made from lower cost material, such as A1SI 4140 or equivalent, if high-hardness is not considered necessary. The elements are secured to a tube or shaft, preferably of low cost low carbon steel. The assembly is preferably, accomplished by locating the various cams and journals in proper orientation in a suitable fixture and inserting the tube in position within aligned openings of these elements. The elements are then locked together on the tube by mechanically expanding the tube by cold pressing a mandreil, or other mechanical expander, through the hollow tube center. This forces the tube exterior into firm engagement with the internal surfaces of the assembled elements while inherently strengthening the tube through work hardening and forming therein a uniform smooth sided interior cross-sectional configuration. Preconfigured openings are preferably provided during formation of the cam and journal elements to positively lock them on the expanded tube surface. Preferably the cam and journal elements are cold formed to provide high strength and a central blank is punched out of each element to provide the preconfigured tube-receiving opening.

If desired, the cam elements may be hardened before assembly. Alternatively, they may first be assembled and then have their wearing surfaces hardened such as by laser, electron beam or induction hardening after the camshaft is assembled. In the latter instance, finish grinding of the camshaft is preferably accomplished before hardening with a light lap being the only required finishing step after the hardening process.

The invention provides a high performance low cost camshaft assembly and process using commonly available materials and capable of being easily implemented. These and other features and advantages of the invention will be more fully understood from the following description of a preferred embodiment, taken together with the accompanying drawings.

BRIEF DRAWING DESCRIPTION

In the drawings FIG. 1 is a pictorial view of a portion of an internal combustion engine camshaft assembly formed in accordance with the invention.

FIG. 5 is a pictorial view of an assembly fixture for orienting the camshaft elements with the elements in position ready for installation of the tube.

FIG. 6 is a cross-sectional view from the plane indicated by the line 6—6 of FIG. showing the manner of positioning one of the cam elements.

FIG. 7 is a cross-sectional view from the plane indicated by the line 7—7 of FIG. 5 showing the manner of positioning one of the journal elements.

DETAILED DESCRIPTION

Figure 1:
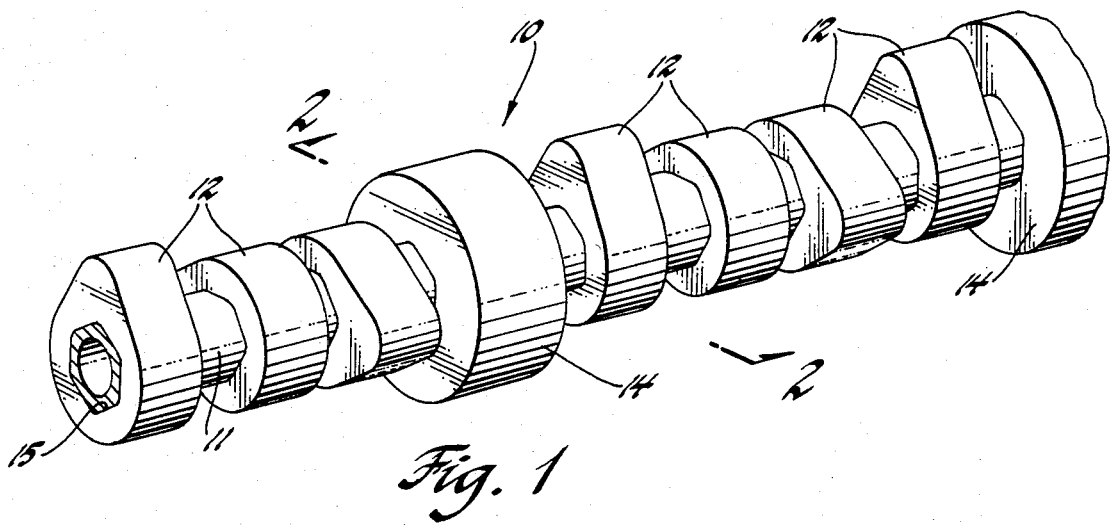
Figure 3:
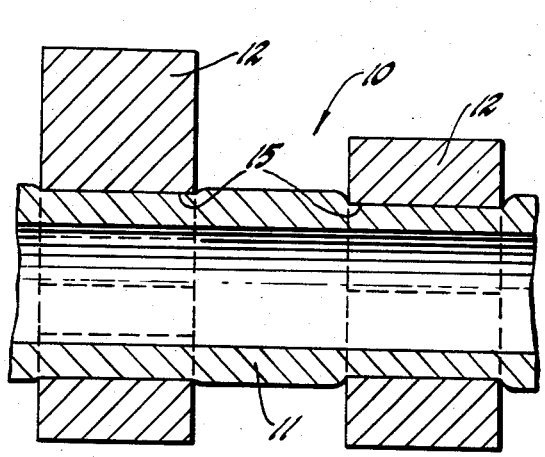
FIG. 3 is a longitudinal cross-sectional view of a portion of the camshaft assembly from the plane indicated by the line 3—3 of FIG. 2.
Figure 2:
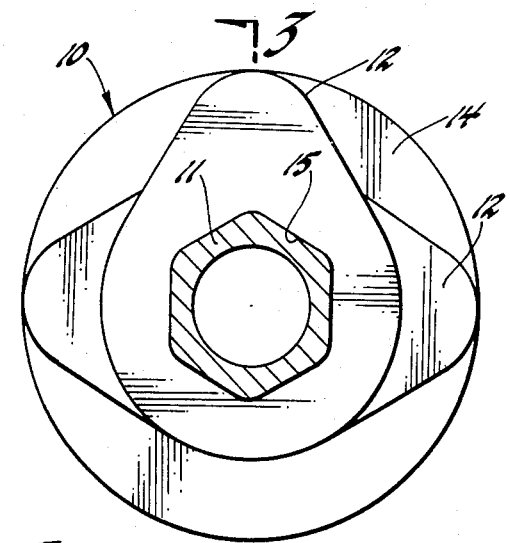
FIG. 2 is a transverse cross-sectional view through a portion of the camshaft assembly from the plane indicated by the line 2—2 of FIG. 1.

Referring now to the drawings in detail, numeral 10 generally indicates a finished camshaft assembly formed in accordance with the invention. Camshaft 10 includes a hollow supporting tube or shaft 11, preferably formed of ordinary low carbon steel which has been expanded in a manner to be subsequently described. Fixedly positioned on the tube are a plurality of cam elements 12 and journal elements 14, the elements being spaced and the cams being angularly oriented in predetermined positions for actuating valve gear in an internal combustion engine or the like. The cam elements are preferably hardened, either fully or on their wearing surfaces, and the journal elements may be similarly formed or, if desired and their operation permits, may be formed of non-hardened material.

The assembly provides a light weight high strength camshaft, by reason of the hollow tubular support and high strength elements with hardened surfaces, which is capable of application in internal combustion engines and other similar devices. If desired, additional elements such as gears or cams for actuating other devices can be included in the camshaft assembly.

The manufacture and assembly of a camshaft in accordance with the invention may include the following steps:

(1) The camshaft components requiring hardenable alloy steel materials, such as cam lobes, distributor gear, fuel pump eccentric and, optionally, the journals, are either cold or warm formed to relatively close tolerances with a small amount of excess material left for grinding and lapping after assembly. The forged, or otherwise formed, blanks are provided with tube receiving openings 15 which are preferably configured in hexagonal or other non-circular configurations adapted to positively lock onto an expanded shaft.

(2) The central tube or shaft 11 is provided consisting of low carbon steel tubing, cold extruded to desired outer and inner diameters and cut to a desired length. The tube outer diameter is preferably such as to fit closely but easily within the preformed openings 15 in the elements 12, 14 etc. and the inner diameter is selected to provide adequate wall strength for manufacture while limiting deformation by mechanical expansion in a manner to be subsequently described.

(3) The individual cam, journal and, possibly, other elements are inserted into a fixture which pre-positions them in their desired final orientations with the openings 15 aligned for insertion of the tube.

(4) The fixture is closed, locking the elements in position and the central tube is slipped through the aligned elements to a predetermined longitudinal position, preferably fixed by a stop, not shown.

Figure 4:
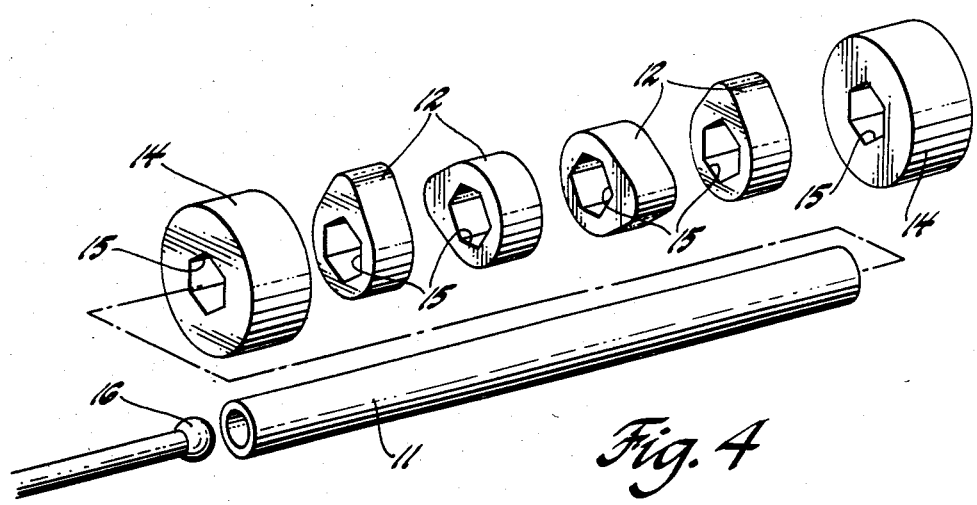
FIG. 4 is an exploded pictorial view illustrating certain elements of the camshaft and its manufacturing method.

(5) A mandrel 16 (FIG. 4), ball or other suitable mechanical expander is then cold pressed through the inner diameter of the central tube, causing it to expand and form a mechanical bond between the tube-shaft and the surrounding components, including the cams journals and, optionally, other elements. The mechanical expansion step forces the outer surface of the central shaft or tube into the preformed hexagonal, or other, configuration of the elements to provide a mechanical lock between them. Portions of the tube between the elements are expanded beyond the opening diameter so as to positively lock the elements in longitudinal relationship also. This method of the fixing cam, journal and, optionally, other elements on the central shaft inherently strengthens the tube through work hardening and forms therein a uniform smooth sided interior cross-sectional configuration, thus providing a very strong assembly capable of maintaining positioning of the elements during subsequent machining and, ultimately, in engine operation.

(6) The assembled unfinished camshaft is then removed from the holding fixture and the wearing surfaces of the cams and journals are ground to final dimensions in conventional manner. At this time other elements, such as a distributor gear or fuel pump eccentric, could also be machined as required. The elements may then be hardened on their wearing surfaces by laser or electron beam hardening processes.

If desired the cam and, optionally, journal elements could be hardened in a furnace or other suitable operation prior to assembly. However, the increased brittleness of hardened elements may be a detriment in subsequent assembly operations which require sufficient strength to resist cracking or significant deformation when the central tube is expanded into engagement with the surfaces of the internal openings 15.

Referring to FIGS. 5-7, there is shown an assembly fixture 17 comprising a base 18 having a longitudinal recess 19 in which are received a plurality of elements including supporting and positioning jaws 20 separated by spacers 22 and retained in position by rails 23. A cover 24 having locking protrusions 26 is adapted to close the top of the fixture 17 and maintain the cam and journal elements 12, 14 in position therein with their openings 15 in axial alignment for insertion of the central shaft or tube 11.

A camshaft assembly and method in accordance with the invention provide the advantages of light weight with relatively simple and low cost manufacture, all in the accordance with the purposes of the invention. While the invention has been described by reference to one preferred embodiment chosen for purposes of illustration, it should be understood that numerous changes could be made in the camshaft design and the manufacturing process without departing from the spirit and scope of the inventive concepts described. Accordingly, it is intended that the invention be limited only by the language of the following claims.

The embodiments of the invention in which an exclusive property or privilege is claimed are defined as follows:

1. A method of manufacturing a camshaft assembly for internal combustion engines and the like, said method including the steps of:
providing a plurality of cam and journal elements formed to final dimensions except for finish grinding, said elements each including an axial opening,
securing said elements in predetermined fixed orientation and spacing with said openings aligned on a common axis,
inserting a hollow tube into said elements in close fitting relation with said openings,
expanding the hollow tube into mechanical interference engagement with all the element openings to secure the elements permanently onto the tube in said predetermined orientation while forming within the tube a uniform smooth sided interior cross-sectional configuration, by forcing through the tube an element sufficiently larger than the tube inner diameter to outwardly deform the tube wall in the required degree and
finish grinding the outer surfaces of the cam and journal elements.

2. A method as in claim 1 wherein said tube is unhardened steel and said cam elements are formed of hardenable steel and are hardened after machining but prior to their assembly with said hollow tube.

3. A method as in claim 1 wherein said openings of the cam elements are non-circular to provide, after expansion of the tube, a high torque capability of the mechanical engagement between the tube and cam elements.

4. A method as in claim 1 wherein said tube is unhardened steel and said cam elements are formed of hardenable steel but are unhardened prior to assembly and grinding, said method further including the step of hardening the cam surfaces of said elements after the finish grinding step.

5. A method as in claim 4 wherein said cam elements are forged for high strength.

6. A method as in claim 5 wherein said openings of the cam elements are non-circular to provide, after expansion of the tube, a high torque capability of the mechanical engagement between the tube and cam elements.

7. A method of manufacturing a camshaft assembly for internal combustion engines and the like, said method including the steps of:
providing a plurality of cam and journal elements, said elements each including an axial opening,
securing said elements in predetermined fixed orientation and spacing with said openings aligned on a common axis,
inserting a hollow tube into said elements, in close fitting relation with said openings, and
expanding the hollow tube into mechanical interference engagement with all the element openings to secure the elements permanently onto the tube in said predetermined orientation while forming within the tube a uniform smooth sided interior cross-sectional configuration by forcing through the tube an element sufficiently larger than the tube inner diameter to outwardly deform the tube wall in the required degree.

8. A camshaft assembly for internal combustion engines and the like, said assembly comprising a plurality of cam and journal elements each including an axial opening and secured in predetermined fixed orientation and spacing, with said openings aligned, on a hollow tube mechanically expanded into interference engagement with all the element openings while forming within the tube a uniform smooth sided interior cross-sectional configuration and having portions of the tube exterior between the elements expanded diametrically beyond the element openings to secure the elements permanently onto the tube in said predetermined orientation.

9. A camshaft assembly as in claim 8 wherein said openings of the cam elements are non-circular to provide a high torque capability of the mechanical engagement between the tube and cam elements.

10. A camshaft assembly as in claim 8 wherein said tube is unhardened steel and said cam elements are formed of hardened steel.

11. A camshaft assembly as in claim 10 wherein said cam elements are forged for high strength.

12. A camshaft assembly as in claim 11 wherein said openings of the cam elements are non-circular to provide a high torque capability of the mechanical engagement between the tube and cam elements.

* * * * *